(12) United States Patent
Mitsunari (10) Patent No.: US 11,507,219 B2
(45) Date of Patent: Nov. 22, 2022

(54) TOUCH PANEL APPARATUS (71) Applicant: HONDA ACCESS CORP., Niiza (JP)

(72) Inventor: Takahiro Mitsunari, Niiza (JP)

(73) Assignee: HONDA ACCESS CORP., Niiza (JP)

( * ) Notice: Subject to any disclaimer, the term of this patent is extended or adjusted under 35 U.S.C. 154(b) by 0 days.

(21) Appl. No.: 17/501,599

(22) Filed: Oct. 14, 2021

(65) Prior Publication Data
US 2022/0129104 A1  Apr. 28, 2022

(30) Foreign Application Priority Data

Oct. 27, 2020 (JP) .............................. JP2020-179406

(51) Int. Cl.
| | |
|---|---|
| *G06F 3/041* | (2006.01) |
| *G06F 3/0362* | (2013.01) |
| *G06F 3/044* | (2006.01) |
| *G09G 5/10* | (2006.01) |
| *G06F 3/039* | (2013.01) |
| *G06F 3/038* | (2013.01) |

(52) U.S. Cl.
CPC .......... *G06F 3/0416* (2013.01); *G06F 3/0362* (2013.01); *G06F 3/044* (2013.01); *G09G 5/10* (2013.01); *G06F 2203/04104* (2013.01)

(58) Field of Classification Search
USPC ....................................................... 345/174
See application file for complete search history.

(56) References Cited

U.S. PATENT DOCUMENTS

| | | | | |
|---|---|---|---|---|
| 9,831,872 | B1 * | 11/2017 | Salter | ................... B60H 1/0065 |
| 2011/0128231 | A1 * | 6/2011 | Mizumoto | ............ G06F 3/0488 |
| | | | | 345/169 |
| 2014/0156107 | A1 * | 6/2014 | Karasawa | .......... G01C 21/3664 |
| | | | | 701/1 |

(Continued)

FOREIGN PATENT DOCUMENTS

| | | |
|---|---|---|
| JP | 2014-203348 A | 10/2014 |
| JP | 2015-210685 A | 11/2015 |

(Continued)

OTHER PUBLICATIONS

Office Action dated Aug. 23, 2022, issued in counterpart JP application No. 2020-179406 with English translation. (6 pages).

*Primary Examiner* — Chineyere D Wills-Burns
(74) *Attorney, Agent, or Firm* — WHDA, LLP (57) ABSTRACT

A touch panel apparatus including a first detector detecting a first operation of a touch operation unit, a second detector detecting a second operation of a rotating operation unit disposed close to the touch operation unit, and a microprocessor performing making a determination whether to prioritize the first or second operation, and outputting an operation command corresponding to the first or second operation in accordance with the determination. The second detector includes six or more touch sensors disposed on an outer peripheral surface of the rotating operation unit, and the microprocessor performs outputting the operation command corresponding to the first operation when the first operation is detected, while not outputting the operation command corresponding to the first operation even if the first operation is detected when the touch operation over a predetermined area on the outer peripheral surface is detected by the touch sensors.

13 Claims, 9 Drawing Sheets

(56) References Cited

U.S. PATENT DOCUMENTS

| | | | | |
|---|---|---|---|---|
| 2015/0169080 A1* | 6/2015 | Choi | ............ | G06F 3/041 |
| | | | | 345/184 |
| 2015/0193073 A1* | 7/2015 | Dmytriw | ............ | G06F 3/03547 |
| | | | | 345/174 |
| 2016/0077582 A1* | 3/2016 | Song | ............ | G06F 3/0362 |
| | | | | 345/173 |
| 2016/0187975 A1* | 6/2016 | Drescher | ............ | G06F 3/0362 |
| | | | | 345/174 |
| 2018/0074639 A1* | 3/2018 | Powell | ............ | G06F 3/044 |
| 2018/0164901 A1 | 6/2018 | O'Mahony et al. | | |
| 2019/0012003 A1* | 1/2019 | Grant | ............ | G06F 3/0312 |
| 2020/0081557 A1* | 3/2020 | Togashi | ............ | G06F 3/0362 |
| 2020/0233521 A1* | 7/2020 | Sasaki | ............ | G06F 3/0393 |

FOREIGN PATENT DOCUMENTS

| | | | |
|---|---|---|---|
| JP | 2015210685 A | * | 11/2015 |
| JP | 2017-027284 A | | 2/2017 |
| JP | 6123590 B2 | | 5/2017 |
| JP | 2020-112906 A | | 7/2020 |

\* cited by examiner

| KNOB OPERATION STATE | | TOUCH SCREEN TOUCH DETERMI-NATION | KNOB ROTATION | TOUCH SCREEN TOUCH SUPPRESSION PROCESSING | KNOB OPERATION COMMAND |
|---|---|---|---|---|---|
| KNOB TOP SURFACE | SHORT OPERATION | OFF | NON-ROTATION | PRESENCE | MUTE |
| | | ON | NON-ROTATION | ABSENCE | DISABLED |
| | LONG OPERATION | OFF | NON-ROTATION | PRESENCE | BRIGHTNESS ADJUSTMENT |
| | | ON | NON-ROTATION | ABSENCE | DISABLED |
| KNOB OUTER PERIPHERAL SURFACE | ONE OR TWO FINGERS TOUCH | OFF | ROTATION | PRESENCE | VOLUME ADJUSTMENT |
| | | | NON-ROTATION | PRESENCE | SCREEN OFF |
| | | ON | ROTATION | ABSENCE | DISABLED |
| | | | NON-ROTATION | ABSENCE | DISABLED |
| | THREE FINGERS TOUCH | OFF | ROTATION | PRESENCE | CHANNEL SWITCHING |
| | | | NON-ROTATION | PRESENCE | DISC TAKE-OUT |
| | | ON | ROTATION | PRESENCE | CHANNEL SWITCHING |
| | | | NON-ROTATION | PRESENCE | DISC TAKE-OUT |

TOUCH PANEL APPARATUS

CROSS-REFERENCE TO RELATED APPLICATION

This application is based upon and claims the benefit of priority from Japanese Patent Application No. 2020-179406 filed on Oct. 27, 2020, the content of which is incorporated herein by reference.

BACKGROUND OF THE INVENTION

Field of the Invention

This invention relates to a touch panel apparatus including a touch operation unit and a rotating operation unit.

Description of the Related Art

Conventionally, there has been a known apparatus in which when a touch icon is touched while a dial is operated with two or more fingers, the touch operation is disabled. Such an apparatus is described, for example, in Japanese Unexamined Patent Publication No. 2015-210685 (JP2015-210685A). Further, there have been a known apparatus in which a capacitive dummy sensor is provided in an operation knob so that when a touch of the operation knob is detected by the dummy sensor, an operation of a touch switch is disabled. Such an apparatus is described, for example, in Japanese Examined Patent Publication No. 6123590 (JP6123590B).

However, the apparatus described in JP2015-210685A only disables the touch operation during the dial operation, and it does not propose any aspect when the dial operation is made during the touch operation. On the other hand, in the apparatus described in JP6123590B, the dummy sensor is provided only for detecting the touch of the operation knob, and a sensor for detecting a command by the operation of the operation knob is separately required, so that the utilization form of the sensor is not efficient.

SUMMARY OF THE INVENTION

An aspect of the present invention is a touch panel apparatus includes: a touch operation unit extended along a plane surface; a first detector detecting an operation of the touch operation unit as a first operation; a rotating operation unit disposed close to the touch operation unit and protruded from the plane surface; a second detector detecting an operation of the rotating operation unit as a second operation; and an electronic control unit including a microprocessor and a memory connected to the microprocessor. The microprocessor is configured to perform making a determination whether to prioritize the first operation detected by the first detector or the second operation detected by the second detector, and outputting an operation command corresponding to the first operation or the second operation in accordance with the determination. The second detector includes a plurality of touch sensors disposed on an outer peripheral surface of the rotating operation unit, and the plurality of touch sensors are six or more touch sensors disposed along a circumferential direction on the outer peripheral surface so that each of the plurality of touch sensors detects a touch operation of the rotating operation unit. The microprocessor is configured to perform the outputting including outputting the operation command corresponding to the first operation when the first operation is detected by the first detector, while not outputting the operation command corresponding to the first operation even if the first operation is detected by the first detector when the touch operation over a predetermined area on the outer peripheral surface is detected by the plurality of touch sensors.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 11. The touch panel apparatus according to an embodiment of the present invention is provided, for example, in a navigation unit mounted in front of a driver's seat of a vehicle.

Figure 1:
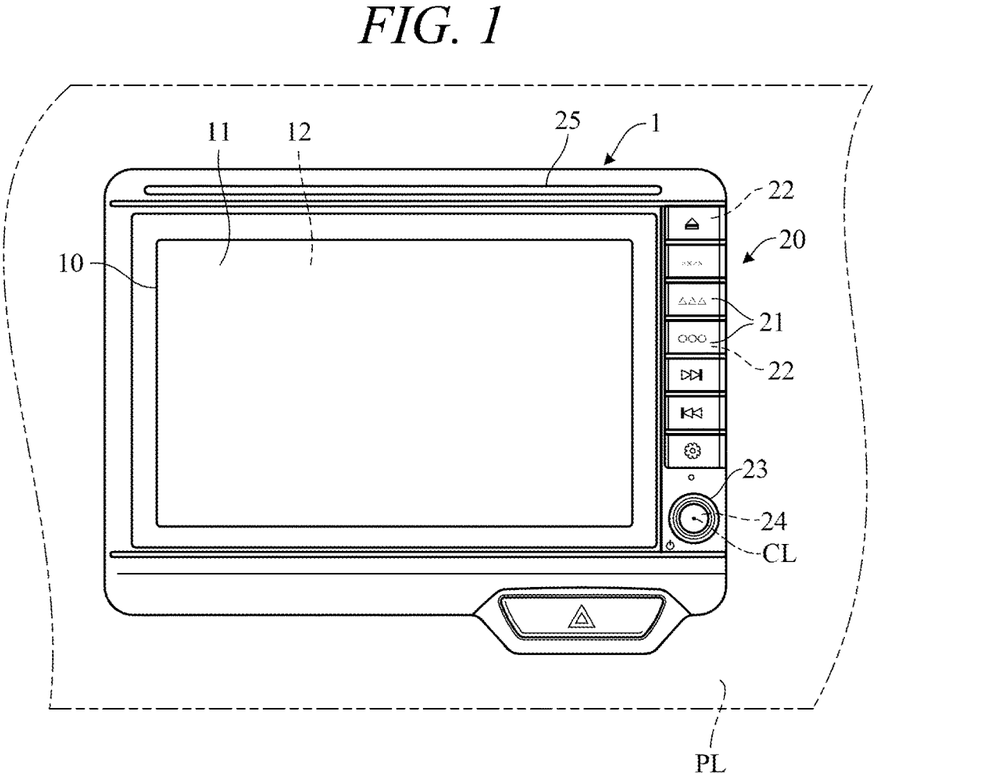
FIG. 1 is a front view schematically showing a configuration of a body of a navigation unit to which a touch panel apparatus according to an embodiment of the present invention is applied.

FIG. 1 is a front view schematically showing a configuration of a body of a navigation unit (a navigation body 1) to which a touch panel apparatus according to an embodiment of the present invention is applied. As shown in FIG. 1, the navigation body 1 includes a display unit 10 for displaying various information such as information on route guidance and setting information of the navigation unit, and an input unit 20 for inputting various commands to the navigation unit by an operation of an occupant. The navigation body 1 has not only a function as a navigation but also a function as an acoustic equipment.

The surface (front surface) of the display unit 10 extends on a virtual vertical plane (virtual plane) PL. The display unit 10 is constituted by a capacitive touch panel 11 covering a large portion of the area of the front surface of the navigation body 1. Therefore, the display unit 10 also functions as the input unit 20. In the following, in order to distinguish it from the touch panel apparatus, the touch panel 11 is referred to as a touch screen. The touch screen 11 is not limited to a capacitive type. The touch screen 11 of various types such as a resistance film type for detecting the operation by the occupant may be used. The touch screen 11 is provided with a touch sensor 12 for detecting an operation position on the touch screen.

The input unit 20 has buttons 21 and a knob 23 disposed on the side of the touch screen 11 (e.g., on the driver's side). The buttons 21 are a plurality of operation members of pressing type arranged in a vertical direction along the side edge of the touch screen 11. It is possible to input a predetermined command by a pressing operation of each button 21. For example, a switching command to a menu screen, a switching command to an audio screen, a display command to a current position, and the like can be input. A pressing switch 22 for detecting the pressing operation of each button 21 is provided at each button 21.

The knob 23 is an operation member of a substantially cylindrical shape projecting from the virtual plane PL. The knob 23 is rotatably supported on the navigation body 1 about an axis CL perpendicular to the virtual plane PL. By rotating the knob 23, it is possible to input a volume change command or a channel switching command (e.g., switching command of a radio broadcasting station). An amount of rotation of the knob 23 is detected by a rotation detector (rotation sensor) 24, such as a rotary encoder, provided at the proximal end of the knob 23. An insertion opening 25 for inserting a disk for music or data is provided above the display unit 10.

Figure 2:
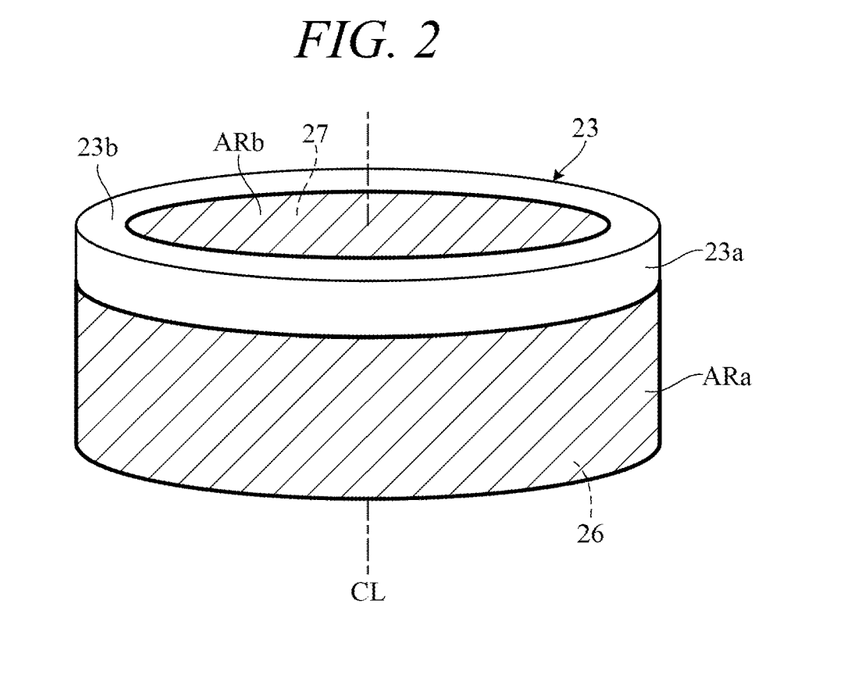
FIG. 2 is a perspective view of a knob included in an input unit of the navigation unit in FIG. 1.

The surface of the knob 23 is further provided with a touch sensor for detecting the operation of the knob 23. FIG. 2 is a perspective view of the knob 23 showing the arrangement of the touch sensor. As shown in FIG. 2, capacitive touch sensors 26 are provided in the area ARa shown by the hatching on outer peripheral surface 23a of the knob 23 of the cylindrical shape. Although not shown, the touch sensors 26 are provided at six or more positions in the circumferential direction (e.g., 10 to 20 positions), for example, at equal intervals in the circumferential direction. Thus, a controller (FIG. 5) to be described later provided in the navigation body 1 can determine the number of fingers touching the outer peripheral surface 23a of the knob 23.

Figure 3A:
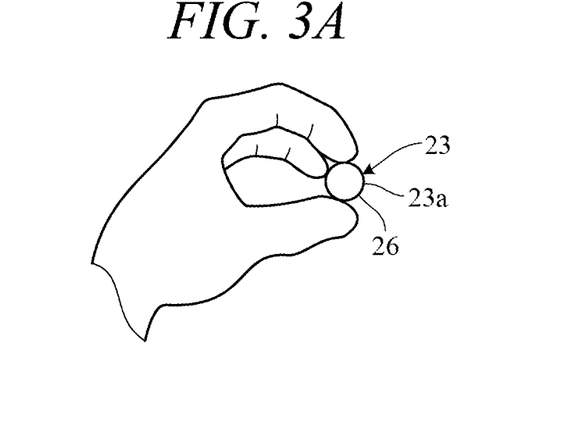
FIG. 3A is a diagram showing an example of an operation of the knob in FIG. 2.
Figure 3B:
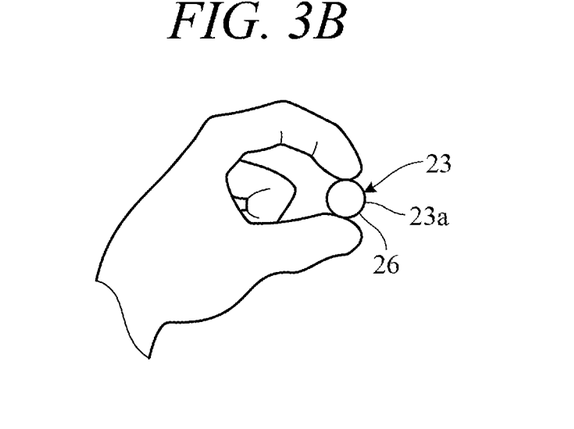
FIG. 3B is a diagram showing another example of an operation of the knob in FIG. 2.

More specifically, when the touch sensors 26 more than or equal to a first predetermined number (e.g., half of the total) are turned on, it is determined that the knob 23 is operated with three fingers as shown in FIG. 3A, and when the touch sensors 26 less than the first predetermined number are turned on, it is determined that the knob 23 is operated with two fingers or with one finger as shown in FIG. 3B. The determination as to whether or not the operation is performed with two fingers can be performed by determining whether or not the touch sensors 26 more than or equal to a second predetermined number smaller than the first predetermined number are turned on. Considering not only the number of the touch sensors 26 that are turned on but also positional relations of the plurality of touch sensors 26 that are turned on, such as whether the plurality of touch sensors 26 that are turned on are offset from each other by a predetermined angle (e.g., 90 degrees) or more in the circumferential direction around the axial CL1, the controller may determine whether the knob 23 is operated by one finger, two fingers, or three fingers. The plurality of touch sensors 26 may be provided not at equal intervals in the circumferential direction but at unequal intervals in the circumferential direction, for example, in a region in the circumferential direction where the knob 23 is operated, in a concentrated manner.

Figure 3C:
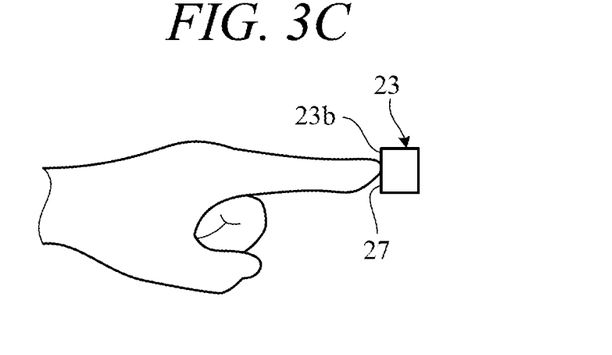
FIG. 3C is a diagram showing a further example of an operation of the knob in FIG. 2.

As shown in FIG. 2, not only on the outer peripheral surface 23a but also on the surface of the distal end portion (top surface 23b) of the knob 23, a capacitive touch sensor 27 is provided in the area ARb shown by hatching. By turning on the touch sensor 27, it is possible to detect that the top surface 23b of the knob 23 is operated with a finger, as shown in FIG. 3C.

Figure 4A:
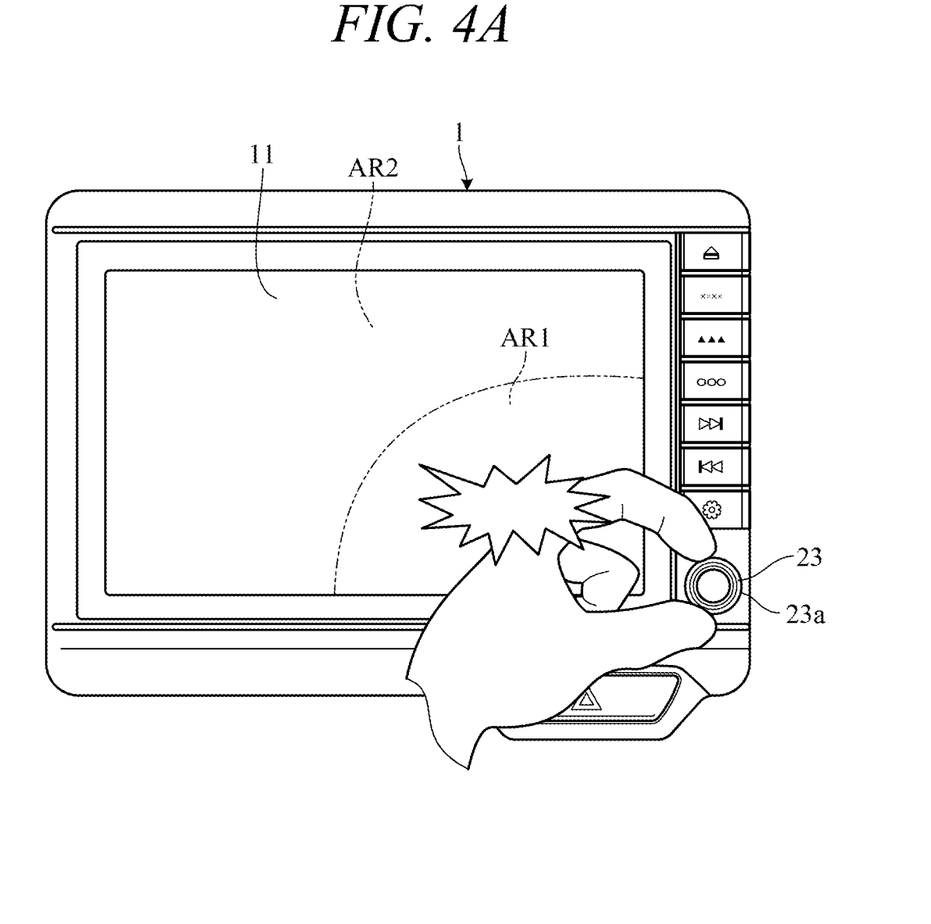
FIG. 4A is a diagram showing an example of an operation of the input unit in FIG. 1.
Figure 4B:
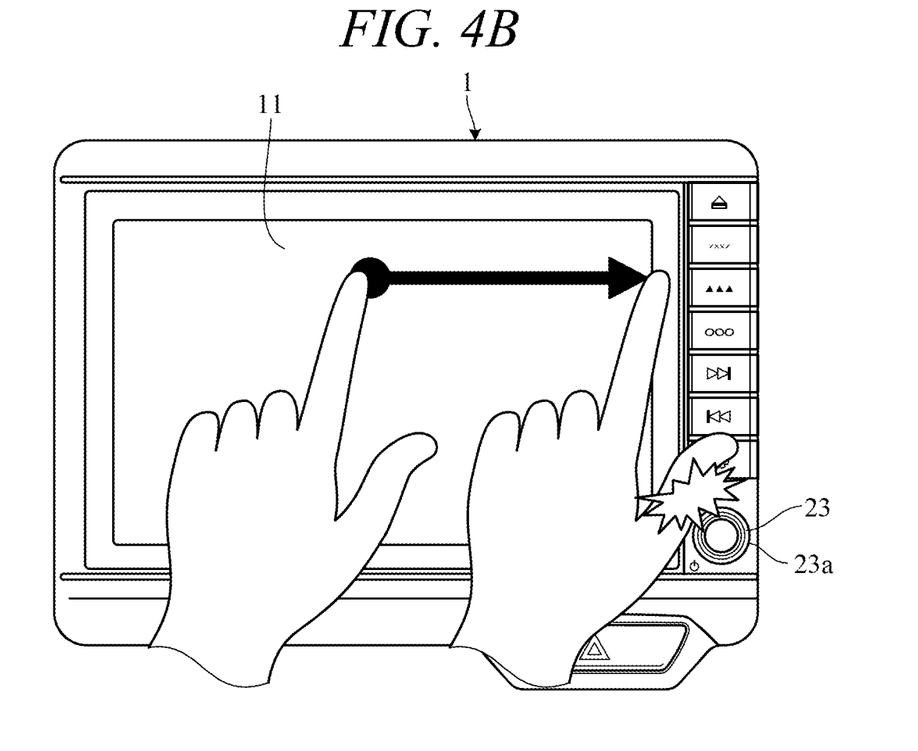
FIG. 4B is a diagram showing another example of an operation of the input unit in FIG. 1.

FIG. 4A and FIG. 4B are diagrams showing examples of operations of the input unit 20, respectively. In particular, FIG. 4A shows a state in which the outer peripheral surface 23a of the knob 23 is operated and a command corresponding to the operation is inputted. In such a state, the touch screen 11 around the knob 23 may be touched by hand during operation of the knob 23 and the touch screen 11 may be accidentally touched. On the other hand, FIG. 4B shows a state in which the touch screen 11 is operated in the direction of an arrow and a command corresponding to the operation is input. In such a state, the outer peripheral surface 23a of the knob 23 may be touched by hand during operation of the touch screen 11 and the knob 23 may be accidentally touched. In order to cope with the case where such an erroneous touch operation is performed, the present embodiment configures a touch panel apparatus as follows.

Figure 5:
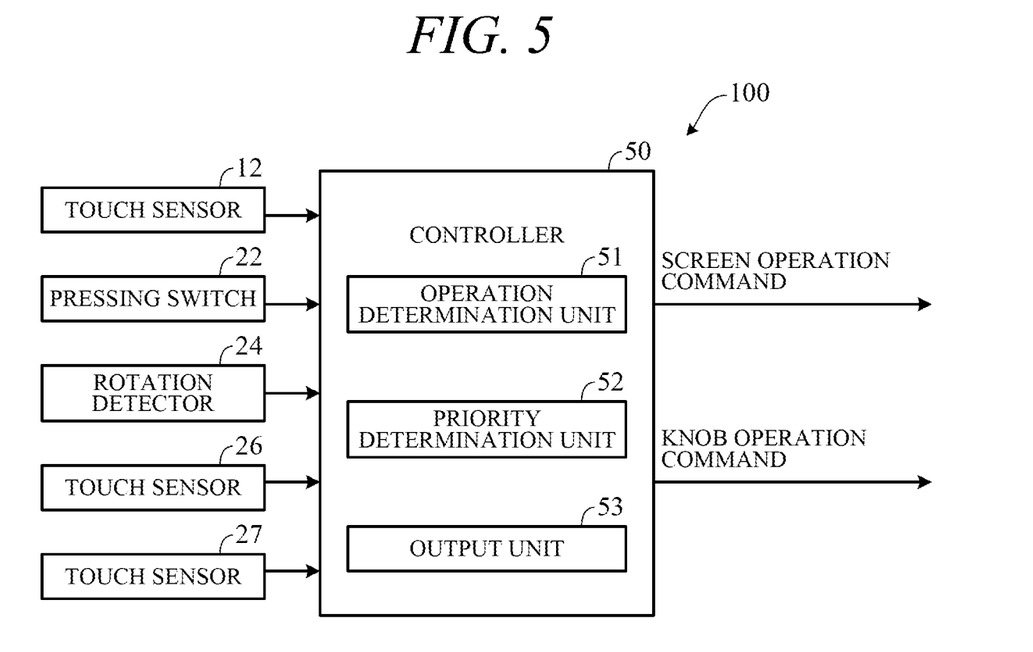
FIG. 5 is a block diagram showing a major-part configuration of the touch panel according to the embodiment of the present invention.

FIG. 5 is a block diagram showing a main configuration of the touch panel apparatus 100 according to the embodiment of the present invention. As shown in FIG. 5, the touch panel apparatus 100 includes a controller (control unit) 50 provided in the navigation body 1. Signals from the touch sensor 12, the pressing switch 22, the rotation detector 24, the touch sensor 26 and the touch sensor 27 are input to the controller 50. The controller 50 executes a predetermined process on the basis of these input signals, and outputs an operation command corresponding to the operation of the touch screen 11 (screen operation command) or an operation command corresponding to the operation of the knob 23 (knob operation command) to the target device such as the display unit 10 and the acoustic equipment.

The controller 50 includes an arithmetic processing unit having a CPU, a ROM, a RAM, and other peripheral circuits. The controller 50 includes, as functional components, an operation determination unit 51, a priority determination unit 52, and an output unit 53.

The operation determination unit 51 determines a manner of the operation of the input unit 20 based on signal from the touch sensors 12, 26, and 27 or the like. Specifically, the operation determination unit 51 determines which of the touch screen 11 and the knob 23 is operated, which of the outer peripheral surface 23a and the top surface 23b of the knob 23 is operated, and how many fingers the outer peripheral surface 23a of the knob 23 is operated.

Figure 6A:
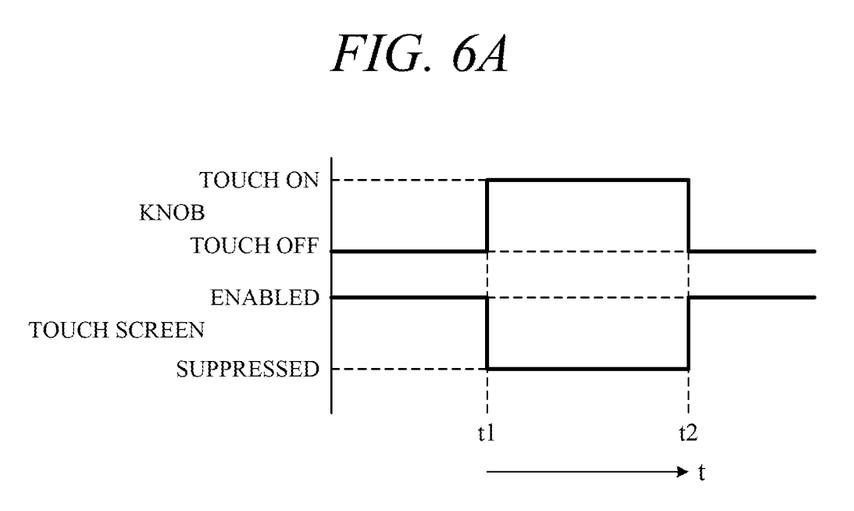
FIG. 6A is a time chart showing an example of an operation in the touch panel apparatus according to the embodiment of the present invention.
Figure 6B:
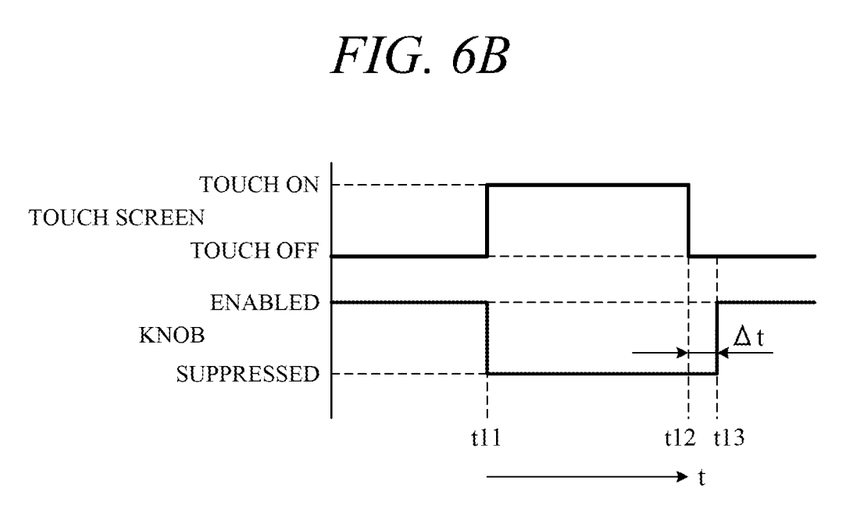
FIG. 6B is a time chart showing another example of an operation in the touch panel apparatus according to the embodiment of the present invention.

The priority determination unit 52 determines whether to prioritize the operation of the touch screen 11 or the operation of the knob 23 based on the determination result by the operation determination unit 51. FIG. 6A and FIG. 6B are time charts showing examples of processes performed by the priority determination unit 52. Touch on and off in FIG. 6A indicate operation and non-operation of the knob 23, and touch on and off in FIG. 6B indicate operation and non-operation of the touch screen 11. As shown in FIG. 6A, in an initial state where the knob 23 is not operated, that is, when the touch operation of the knob 23 is not detected by the touch sensors 26 and 27 (touch-off), the operation of the touch screen 11 is enabled. Therefore, when the touch screen 11 is operated in this state, the operation is validated.

When the touch operation of the knob 23 is detected by the touch sensors 26 and 27 at time t1 without the touch screen 11 being operated (touch-on), the operation of the touch screen 11 is suppressed. Therefore, even if the finger touches the touch screen 11 as shown in FIG. 4A, the operation is invalidated. At time point t2, when fingers are away from the knob 23 and the touch operation of the knob 23 is completed (touch-off), the operation of the touch screen 11 is enabled again.

On the other hand, as shown in FIG. 6B, in an initial state where the touch screen 11 is not operated, that is, the touch operation of the touch screen 11 is not detected by the touch sensor 12 (touch-off), the operation of the knob 23 is enabled. Therefore, when the knob 23 is operated in this state, the operation is validated. If the touch operation of the touch screen 11 is detected by the touch sensor 12 at time t11 (touch-on) without the knob 23 being operated, the operation of the knob 23 is suppressed. Therefore, even if the finger touches the knob 23 as shown in FIG. 4B, the operation is invalidated.

In the operation of the touch screen 11, for example, a flick operation, even if the touch operation is once turned off, the touch screen 11 may be operated again immediately thereafter. Considering this point, at time t12, even if fingers are away from the touch screen 11 and the touch operation of the touch screen 11 is completed once (touch-off), the operation of the knob 23 remains suppressed for a predetermined time Δt (for example, about 0.4 seconds). Therefore, even if the knob 23 is touched within the predetermined time Δt, the operation is invalidated. At time t13, when the predetermined time Δt elapses from time t12, the touch operation of the knob 23 is again enabled.

The output unit 53 of FIG. 5 outputs an operation command (a screen operation command) corresponding to the operation of the touch screen 11 or an operation command (a knob operation command) corresponding to the operation of the knob 23 according to superiority or inferiority of the operation of the touch screen 11 and the operation of the knob 23 determined by the priority determination unit 52. That is, as shown in FIG. 6A, when the touch operation of the knob 23 is turned on, the knob operation command is output, and when the touch operation of the touch screen 11 is turned on, as shown in FIG. 6B, the screen operation command is output.

The knob operation command includes a command for changing a brightness of the display unit 10 (touch screen 11), a screen off command of the display unit 10, a command for changing a volume, a switching command of a channel such as a radio broadcasting station, a disc take-out command from the insertion opening 25, and the like. The screen operation command includes various commands related to route guidance and various commands for acoustic equipment. The knob operation command or screen operation command may include an operation command for devices other than the display unit 10 and the acoustic equipment, for example, an operation command for a vehicle air conditioner.

Incidentally, in FIG. 6B, when the knob 23 is touched while the touch operation of the touch screen 11 is turned on, or when the knob 23 is touched within the predetermined time Δt after the touch operation of the touch screen 11 is turned off, the touch operation is determined to be an erroneous operation and is disabled, but there is a case where the touch operation is not limited to an erroneous operation. For example, when the knob 23 is operated with three fingers, it is considered that the intention of the occupant is reflected in the operation of the knob 23, and it is unlikely that the operation is erroneous. Therefore, in this case, it is preferable to enable the touch operation of the knob 23.

Figure 7:
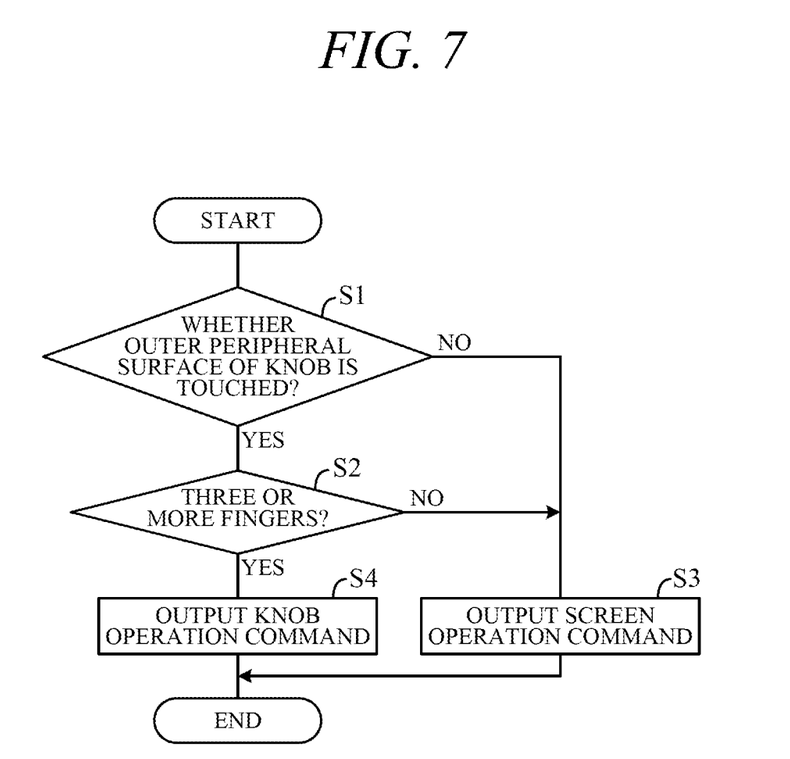
FIG. 7 is a flowchart showing an example of a process performed by a controller unit in FIG. 5.

FIG. 7 is a flowchart showing an example of processing executed by the controller 50 in this case. The processing shown in this flowchart is started when the touch operation of the touch screen 11 is detected by the touch sensor 12 or when an elapsed time from the time the touch operation has not been detected is within the predetermined time Δt. That is, the processing in the flowchart is started while the touch operation of the knob 23 is suppressed in time t11 to time t13 in FIG. 6B, and the processing is repeated at a predetermined cycle.

As shown in FIG. 7, first, in S1 (S: processing step), it is determined whether or not the outer peripheral surface 23a of the knob 23 is touched based on signal from the touch sensor 26. If the determination in S1 is YES, the process proceeds to S2, and if the determination in S1 is NO, the process proceeds to S3. In S3, based on signal from the touch sensor 12, the screen operation command corresponding to the operation of the touch screen 11 is output, and the processing is terminated.

On the other hand, in S2, based on signal from the touch sensor 26, it is determined whether or not the outer peripheral surface 23a of the knob 23 is operated by three or more fingers. If the determination in S2 is YES, the process proceeds to S4, and if the determination in S2 is NO, the process proceeds to S3. In S4, the knob operation command corresponding to the operation of the knob 23 is output, and the processing is terminated. For example, when the rotation of the knob 23 in a predetermined direction is detected by the rotation detector 24, a command to switch the channel to the positive side is output, while when the rotation in the opposite direction is detected, a command to switch the channel to the negative side is output. When the rotation of the knob 23 is not detected, a disk ejection command is output.

Figure 8:
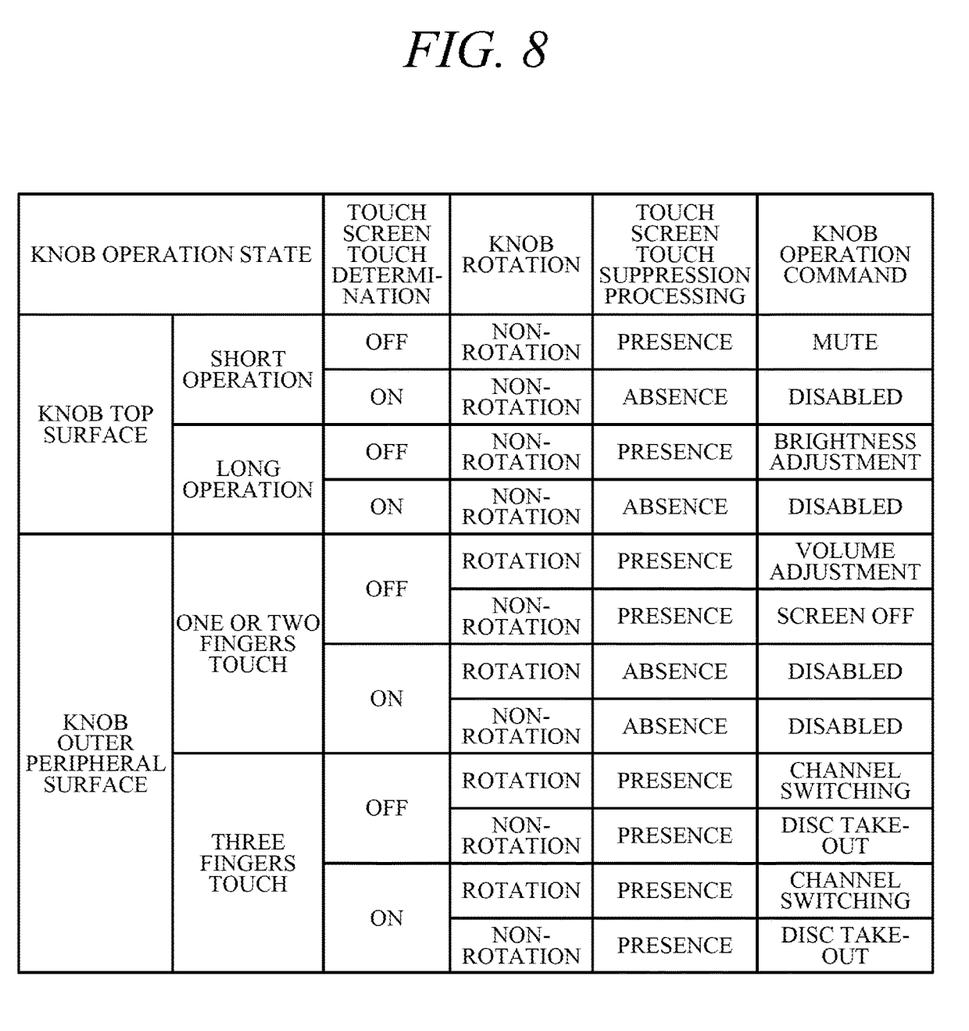
FIG. 8 is a diagram showing collectively an example of a plurality of operations in the touch panel apparatus according to the embodiment of the present invention.

FIG. 8 is a diagram showing collectively an example of a plurality of knob operation command by the operation of the knob 23. As shown in FIG. 8, when the touch operation on the top surface 23b of the knob 23 is detected, a different knob operation command is output depending on whether or not the touch operation continues for a predetermined time or more. That is, in a case of a short operation in which a duration time of the touch operation is less than the predetermined time, when the touch operation of the touch screen 11 is not detected (touch determination off), a mute command is output as a first operation command. On the other hand, when the touch operation of the touch screen 11 is detected (touch determination on), the short operation on the top surface 23b of the knob 23 is disabled.

Figure 9:
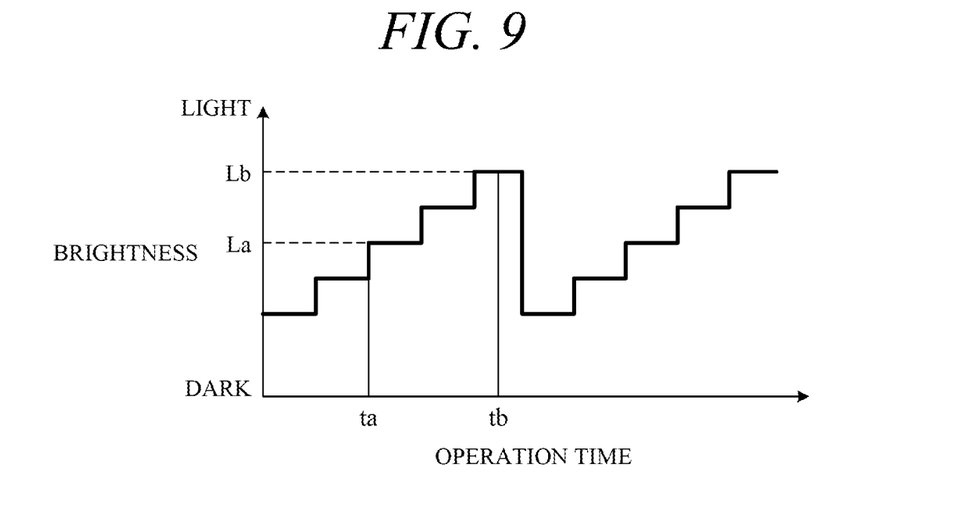
FIG. 9 is a time chart showing an operation of a change in brightness among the operations in FIG. 8.

In contrast, in a case of a long operation in which the duration time of the touch operation on the top surface 23b of the knob 23 is more than or equal to the predetermined time, when the touch operation of the touch screen 11 is not detected, the brightness adjustment command of the screen of the display unit 10 is output as a second operation command. On the other hand, when the touch operation of the touch screen 11 is detected, the long operation on the top surface 23b of the knob 23 is disabled. FIG. 9 is a time chart showing a change in brightness according to the touch operation. As shown in FIG. 9, when the operation on the top surface 23b of the knob 23 continues, the brightness becomes brighter stepwise over time, and after the brightness reaches the maximum brightness, the brightness returns to the minimum brightness. For example, in the state of the brightness La, the touch operation on the top surface 23b is started at time ta, and when the touch operation is completed at time tb, the brightness becomes Lb.

As shown in FIG. 8, when the touch operation on the outer peripheral surface 23a of the knob 23 is detected, the knob operation command is output depending on whether the touch operation is a touch operation with three or more fingers, or a touch operation with less than three fingers (e.g., one finger or two fingers), and whether the touch operation is performed along with a rotation of the knob 23. That is, in a case that the touch operation is performed with less than three fingers, when the touch operation of the touch screen 11 is not detected and the knob 23 is rotated, a command for increasing or decreasing volume is output as the third operation command. On the other hand, when the knob 23 is not rotated, a screen off of the display unit 10 is output as another third operation command. In the case that the touch operation is performed with less than three fingers, when the touch operation of the touch screen 11 is detected, the touch operation on the outer peripheral surface 23a of the knob 23 is disabled.

In contrast, in a case that the touch operation is performed with three or more fingers, even if the touch operation of the touch screen 11 is detected or not detected, the knob operation command corresponding to the presence or absence of rotation of the knob 23 is output (S4 in FIG. 7). That is, when the knob 23 is rotated, the switching of the channel (e.g. radio broadcast station) to the positive side or negative side is instructed, and when the knob 23 is not rotated, the take-out of the disc is instructed (fourth operation command). Thus, when the touch screen 11 and the knob 23 are simultaneously touched, it is possible to output an operation command that matches the intention of the occupant. The above-mentioned first to fourth operation command are only examples, and are not limited to those described above.

According to the present embodiment, following functions and effects can be exerted.

(1) The touch panel apparatus 100 includes: a touch screen 11 that extends along the virtual plane PL; a touch sensor 12 that detects the touch operation of the touch screen 11; a knob 23 that is disposed near the touch screen 11 and protrudes from the virtual plane PL; touch sensors 26 and 27 that detect the touch operation of the knob 23; and a controller 50 that determines whether to prioritize the touch operation of the touch screen 11 detected by the touch sensor 12 or the touch operation of the knob 23 detected by the touch sensors 26 and 27, and outputs the operation command corresponding to the touch operation of the touch screen 11 or the knob 23 according to the determination (FIGS. 1, 2, and 5). The touch sensors 26 are provided at six or more positions in the circumferential direction along the outer peripheral surface 23a of the knob 23, and is configured by a plurality of touch sensors 26 that detect presence or absence of the touch operation of the knob 23 at each position (FIG. 2). When the operation of the touch screen 11 is detected by the touch sensor 12, the controller 50 outputs the screen operation command corresponding to the operation, and when the touch operation (touch operation over a predetermined range or more of the outer peripheral surface 23a) with three or more fingers on the outer peripheral surface 23a of the knob 23 is detected by the plurality of touch sensors 26, even if the operation of the touch screen 11 is detected by the touch sensor 12, the screen operation command corresponding to the operation of the touch screen 11 is not output (FIG. 7).

Thus, when the touch operation of the knob 23 is performed during the operation of the touch screen 11, it is possible to output an operation command that matches the intention of the occupant. That is, when the knob 23 is operated by three or more fingers, the operation of the knob 23 is prioritized over the operation of the touch screen 11, and thus it is possible to output a good operation command reflecting the intention of the occupant. Further, since the touch sensor 26 is not a dummy sensor and the operation command corresponding to the detected value of the touch sensor 26 is output, the sensor can be used efficiently.

(2) At the knob 23, a plurality of touch sensors 26 provided along the outer peripheral surface 23a and a touch sensor 27 provided on the top surface 23b of the distal end portion of the knob 23 for detecting the touch operation with respect to the top surface 23b is provided (FIG. 2). When the touch operation with three or more fingers on the outer peripheral surface 23a of the knob 23 is detected by the touch sensor 26, the controller 50 outputs the knob operation command corresponding to the touch operation detected by the touch sensors 26 without outputting the screen operation command corresponding to the operation of the touch screen 11 even if the operation of the touch screen 11 is detected by the touch sensor 12 (FIG. 7). Thus by providing the touch sensors 26 and 27 respectively on the outer peripheral surface 23a and the top surface 23b of the knob 23, while suppressing an increase in the number of the operation member, the touch panel apparatus can be configured so that a plurality of operation commands corresponding to the operation position of the knob 23 are output.

(3) When the operation of the knob 23 is detected by the touch sensor 26 in a situation where the operation of the touch screen 11 is not detected by the touch sensor 12, the controller 50 outputs the knob operation command corresponding to the operation of the knob 23, while when the touch operation such as a flick operation is detected by the touch sensor 12, the controller 50 does not output the operation command according to the operation of the knob 23 for the predetermined time Δt from a time the operation such as the flick operation has not been detected even if the operation of the knob 23 is detected by the touch sensor 26 during the predetermined time Δt (FIG. 6B). As a result, the touch operation can be enabled and disabled in consideration of the operation pattern of the touch screen 11, for example, the touch screen 11 is operated again immediately after the flick operation. That is, since the operation of the touch screen 11 is prioritized immediately after the flick operation, it is possible to prevent the operation of the touch screen 11 from being erroneously canceled by the operation of the knob 23.

Various modifications of the above embodiment are possible. Some examples are explained in the following. In the above embodiment, when the outer peripheral surface 23a of the knob 23 is operated by three or more fingers, the operation command by the touch operation of the touch screen 11 is not output. However, when the knob 23 is rotated by a predetermined amount or more, the operation command by the touch operation of the touch screen 11 may not be output. That is, even when the knob 23 is rotated by the predetermined amount or more, it is presumed that the operation is not an erroneous operation of the knob 23 but an operation in accordance with the intention of the occupant. Therefore, in this case as well, the operation of the knob 23 may be prioritized.

Figure 10:
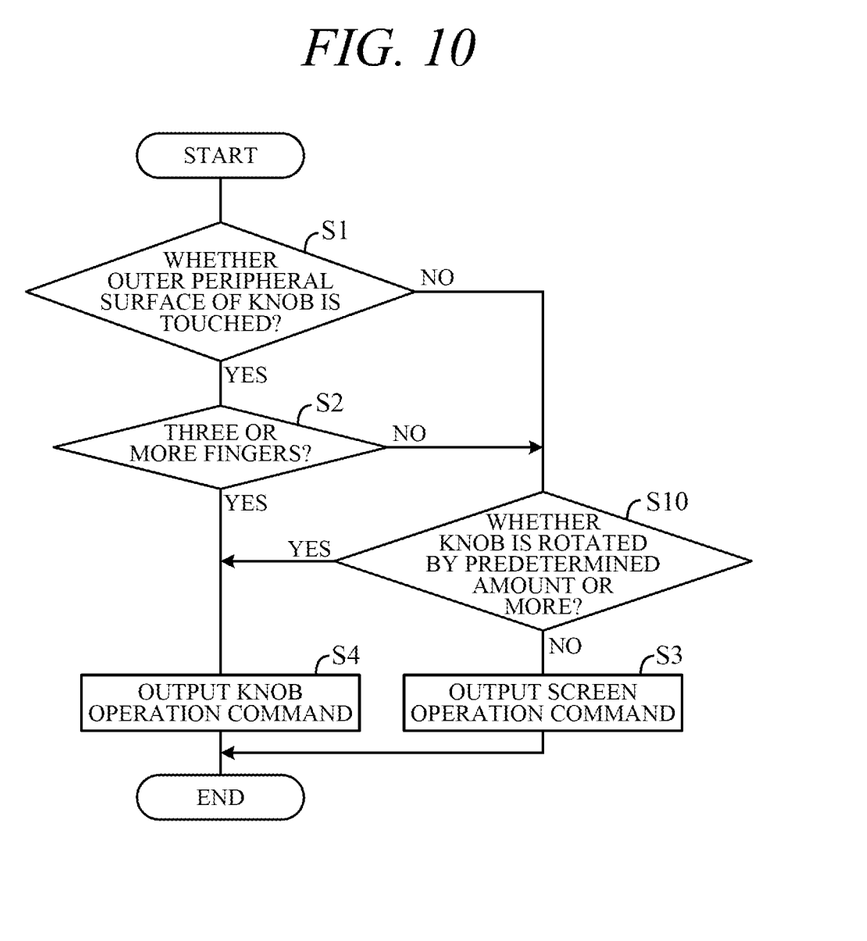
FIG. 10 is a flowchart showing a modification of FIG. 7.

FIG. 10 is a flowchart showing an example of processing in the controller 50 for realizing such an operation. In FIG. 10, the same reference numerals are assigned to the portions where the same processing as that in FIG. 7 is performed. As shown in FIG. 10, if the determination in S1 or S2 is NO, the process proceeds to S10. In S10, it is determined whether or not the rotation operation of the knob 23 by a predetermined amount (e.g., 180 degrees) or more, is detected by the rotation detector 24. If the determination in S10 is NO, the process proceeds to S3, and if the determination is YES, the process proceeds to S4. Thus, when the rotation operation of the predetermined amount or more is detected by the rotation detector 24, even if the touch operation of the touch screen 11 is detected without the touch operation by the three or more fingers being detected by the touch sensor 26, the touch panel apparatus can be configured so that the operation command corresponding to the touch operation of the touch screen 11 is not output.

Figure 11:
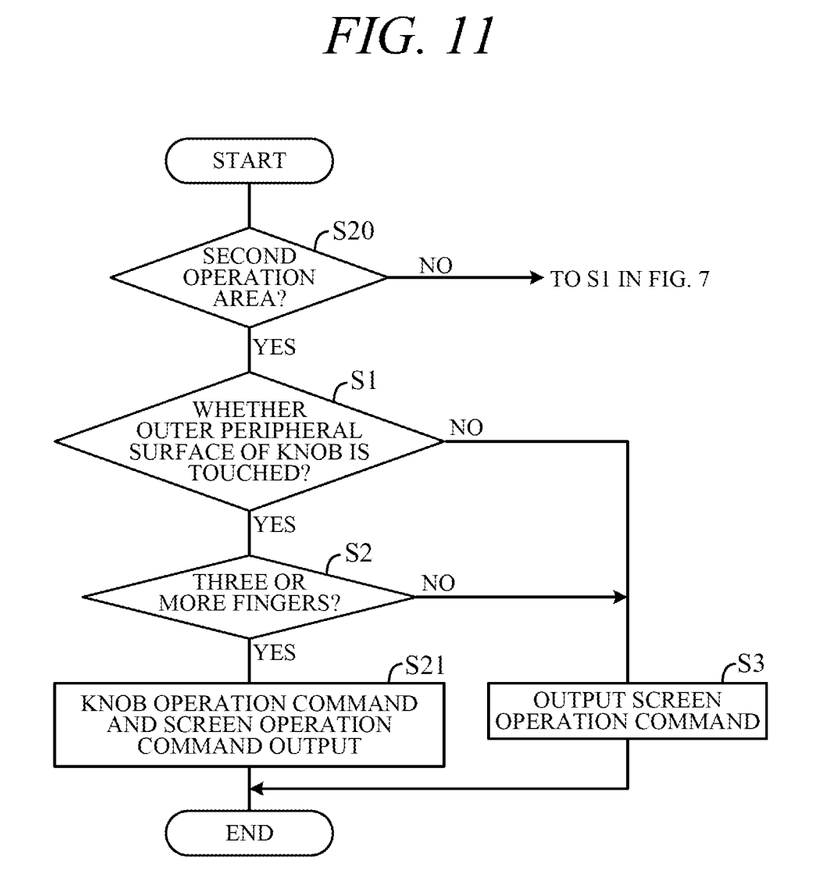
FIG. 11 is a flowchart showing another modification of FIG. 7.

As shown in FIG. 4A, when the knob 23 is operated, an area in which erroneous operation of the touch screen 11 is likely to occur is, for example, a first operation area AR1 around the knob 23. In the second operation area AR2 outside the first operation area AR1, the hand of the occupant operating the knob 23 is difficult to touch. Therefore, it is unlikely to cause erroneous operation in the second operation area. In consideration of this point, the controller 50 may perform the process of FIG. 11 instead of the process of FIG. 7. In FIG. 11, the same reference numerals are assigned to the portions where the same processing as that in FIG. 7 is performed.

In FIG. 11, first, in S20, based on signal from the touch sensor 12, it is determined whether or not the position of the touch operation (first operation) on the touch screen 11 is within the second operation area AR2, that is, whether or not the first operation (second area operation) is performed within the second operation area AR2. If the determination in S20 is NO, that is, it is determined that the position of the touch operation is within the first operation area AR1 and it is determined that the first operation (first area operation) is performed within the first operation area AR1, the process proceeds to S1 of FIG. 7, and the same process as described above is performed.

On the other hand, if the determination in S20 is YES, the process proceeds to S1, and further if the determination in S1 is YES, the process proceeds to S2, while if the determination in S1 is NO, the process proceeds to S3. If the determination in S2 is YES, the process proceeds to S21, while if the determination in S2 is NO, the process proceeds to S3. In S21, the knob operation command corresponding to the touch operation of the knob 23 is output, and the screen operation command corresponding to the touch operation of the screen is output. This allows the touch operation of the touch screen 11 to be enabled when, for example, an occupant in the passenger's seat operates the touch screen 11 while an occupant (driver) in the driver's seat operates the knob 23.

In the above embodiment, a single touch screen 11 is formed along the virtual plane PL. However, a touch operation unit is not limited thereto, and a plurality of touch operation units may extend along the plane. In the above embodiment, the operation of the touch screen 11 (a first operation) is detected by the touch sensor 12. However, the configuration of a first detector is not limited to that described above.

In the above embodiment, the knob 23 having a substantially cylindrical shape is protruded from the virtual plane PL on the side of the touch screen 11. However, a rotating operation unit may be placed other than the side if the rotating operation unit is placed close to the touch screen 11 where there is a risk of an erroneous operation of the touch screen 11. Further, the shape of the rotating operation unit may be other than the cylindrical shape. In the above embodiment, the touch operation (a second operation) on the outer peripheral surface 23a of the knob 23 is detected by the touch sensors 26 (a first touch sensor) and the touch operation of the top surface 23b is detected by the touch sensor 27 (a second touch sensor). However, as long as the touch sensor includes a plurality of touch sensors that are provided at least six or more along the outer peripheral surface of the rotating operation unit and are configured to detect presence or absence of the touch operation on the outer peripheral surface of the rotating operation unit at each location, the configuration of a second detector may be any configuration.

In the above embodiment, the controller 50 serving as a control unit determines whether to prioritize the operation of the touch screen 11 detected by the touch sensor 12 or the operation of the knob 23 detected by the touch sensors 26 and 27, and outputs the screen operation command or the knob operation command according to the determination. However, the configuration of a control unit may be any configuration as long as outputting the screen operation command when the operation of the touch screen 11 is detected and not outputting even if the operation of the touch screen 11 is detected when the touch operation over a predetermined area on the outer peripheral surface of the rotating operation unit is detected by the plurality of touch sensors 26.

The above embodiment can be combined as desired with one or more of the above modifications. The modifications can also be combined with one another.

According to the present invention, it is possible to successfully determine whether to prioritize an operation of a rotation operation unit or a touch operation unit when the rotation operation unit is operated during the operation of the touch operation unit without using a dummy sensor.

Above, while the present invention has been described with reference to the preferred embodiments thereof, it will be understood, by those skilled in the art, that various changes and modifications may be made thereto without departing from the scope of the appended claims.

What is claimed is:

1. A touch panel apparatus comprising:
a touch operation unit extended along a plane surface;
a first detector detecting an operation of the touch operation unit as a first operation;
a rotating operation unit disposed in a vicinity of the touch operation unit and protruded from the plane surface;
a second detector detecting an operation of the rotating operation unit as a second operation; and
an electronic control unit including a microprocessor and a memory connected to the microprocessor, wherein
the microprocessor is configured to perform
making a determination whether to prioritize the first operation detected by the first detector or the second operation detected by the second detector, and outputting an operation command corresponding to the first operation or the second operation in accordance with the determination,
the second detector includes a plurality of touch sensors disposed on an outer peripheral surface of the rotating operation unit, the plurality of touch sensors are six or more touch sensors disposed along a circumferential direction on the outer peripheral surface so that each of the plurality of touch sensors detects a touch operation of the rotating operation unit, the microprocessor is configured to perform the outputting including outputting the operation command corresponding to the first operation when the first operation is detected by the first detector, while not outputting the operation command corresponding to the first operation even if the first operation is detected by the first detector when the touch operation over a predetermined area on the outer peripheral surface is detected by the plurality of touch sensors, the second detector further includes a rotation sensor detecting a rotation angle of the rotating operation unit, and the microprocessor is further configured to perform the outputting including not outputting the operation command corresponding to the first operation even if the first operation is detected by the first detector in a situation where the touch operation over the predetermined area is not detected by the plurality of touch sensors when the rotation angle detected by the rotation sensor is more than or equal to a predetermined rotation angle.

2. The touch panel apparatus according to claim 1, wherein an operation area of the touch operation unit includes a first operation area around the rotating operation unit and a second operation area outside the first operation area, the first detector is configured to detect the first operation of the first operation area as a first area operation and the first operation of the second operation area as a second area operation, and the microprocessor is configured to perform the outputting including not outputting an operation command corresponding to the first area operation even if the first area operation is detected by the first detector when the touch operation over the predetermined area is detected by the plurality of touch sensors, while outputting an operation command corresponding to the second area operation when the second area operation is detected by the first detector.

3. The touch panel apparatus according to claim 1, wherein the touch operation over the predetermined area corresponds to a touch operation with three or more fingers of a user.

4. The touch panel apparatus according to claim 3, wherein the operation command corresponding to the first operation is a first operation command, the operation command corresponding to the second operation is a second operation command, and the microprocessor is configured to perform the outputting including outputting a third operation command when the touch operation over an area less than the predetermined area on the outer peripheral surface is detected by the plurality of touch sensors in a situation where the first operation is not detected by the first detector, while outputting a fourth command different from the third command when the touch operation over the predetermined area on the outer peripheral surface is detected by the plurality of touch sensors.

5. A touch panel apparatus comprising:

a touch operation unit extended along a plane surface;

a first detector detecting an operation of the touch operation unit as a first operation;

a rotating operation unit disposed in a vicinity of the touch operation unit and protruded from the plane surface;

a second detector detecting an operation of the rotating operation unit as a second operation; and an electronic control unit including a microprocessor and a memory connected to the microprocessor, wherein the microprocessor is configured to perform making a determination whether to prioritize the first operation detected by the first detector or the second operation detected by the second detector, and outputting an operation command corresponding to the first operation or the second operation in accordance with the determination, the second detector includes a plurality of touch sensors disposed on an outer peripheral surface of the rotating operation unit, the plurality of touch sensors are six or more touch sensors disposed along a circumferential direction on the outer peripheral surface so that each of the plurality of touch sensors detects a touch operation of the rotating operation unit, the microprocessor is configured to perform the outputting including outputting the operation command corresponding to the first operation when the first operation is detected by the first detector, while not outputting the operation command corresponding to the first operation even if the first operation is detected by the first detector when the touch operation over a predetermined area on the outer peripheral surface is detected by the plurality of touch sensors, the plurality of touch sensors are first touch sensors, the second detector further includes a second touch sensor disposed on a top surface of the rotating operation unit to detect a touch operation on the top surface, and the microprocessor is configured to perform the outputting including outputting the operation command corresponding to the touch operation detected by the first touch sensors or the second touch sensor without outputting the operation command corresponding to the first operation even if the first operation is detected by the first detector when the touch operation over the predetermined area on the outer peripheral surface is detected by the first touch sensors or a predetermined touch operation on the top surface is detected by the second touch sensor, and the microprocessor is further configured to perform the outputting including outputting a first operation command when a duration time of the touch operation on top surface detected by the second touch sensor is shorter than a predetermined time, while outputting a second operation command different from the first operation command when the duration time is longer than or equal to the predetermined time.

6. The touch panel apparatus according to claim 5, wherein the second operation command is a brightness adjustment command for a display unit including the touch operation unit.

7. The touch panel apparatus according to claim 5, wherein
an operation area of the touch operation unit includes a first operation area around the rotating operation unit and a second operation area outside the first operation area,
the first detector is configured to detect the first operation of the first operation area as a first area operation and the first operation of the second operation area as a second area operation, and
the microprocessor is configured to perform
the outputting including not outputting an operation command corresponding to the first area operation even if the first area operation is detected by the first detector when the touch operation over the predetermined area is detected by the plurality of touch sensors, while outputting an operation command corresponding to the second area operation when the second area operation is detected by the first detector.

8. The touch panel apparatus according to claim 5, wherein
the touch operation over the predetermined area corresponds to a touch operation with three or more fingers of a user.

9. The touch panel apparatus according to claim 8, wherein
the operation command corresponding to the first operation is a first operation command,
the operation command corresponding to the second operation is a second operation command, and
the microprocessor is configured to perform
the outputting including outputting a third operation command when the touch operation over an area less than the predetermined area on the outer peripheral surface is detected by the plurality of touch sensors in a situation where the first operation is not detected by the first detector, while outputting a fourth command different from the third command when the touch operation over the predetermined area on the outer peripheral surface is detected by the plurality of touch sensors.

10. A touch panel apparatus comprising:
a touch operation unit extended along a plane surface;
a first detector detecting an operation of the touch operation unit as a first operation;
a rotating operation unit disposed in a vicinity of the touch operation unit and protruded from the plane surface;
a second detector detecting an operation of the rotating operation unit as a second operation; and
an electronic control unit including a microprocessor and a memory connected to the microprocessor, wherein
the microprocessor is configured to perform
making a determination whether to prioritize the first operation detected by the first detector or the second operation detected by the second detector, and outputting an operation command corresponding to the first operation or the second operation in accordance with the determination,
the second detector includes a plurality of touch sensors disposed on an outer peripheral surface of the rotating operation unit,
the plurality of touch sensors are six or more touch sensors disposed along a circumferential direction on the outer peripheral surface so that each of the plurality of touch sensors detects a touch operation of the rotating operation unit,
the microprocessor is configured to perform
the outputting including outputting the operation command corresponding to the first operation when the first operation is detected by the first detector, while not outputting the operation command corresponding to the first operation even if the first operation is detected by the first detector when the touch operation over a predetermined area on the outer peripheral surface is detected by the plurality of touch sensors, and
the microprocessor is further configured to perform
the outputting including outputting the operation command corresponding to the second operation when the second operation is detected by the second detector in a situation where the first operation is not detected by the first detector, while after a predetermined first operation is detected by the first detector, not outputting the operation command corresponding to the second operation for a predetermined time period from a time when the predetermined first operation is not detected even if the second operation is detected by the second detector.

11. The touch panel apparatus according to claim 10, wherein
an operation area of the touch operation unit includes a first operation area around the rotating operation unit and a second operation area outside the first operation area,
the first detector is configured to detect the first operation of the first operation area as a first area operation and the first operation of the second operation area as a second area operation, and
the microprocessor is configured to perform
the outputting including not outputting an operation command corresponding to the first area operation even if the first area operation is detected by the first detector when the touch operation over the predetermined area is detected by the plurality of touch sensors, while outputting an operation command corresponding to the second area operation when the second area operation is detected by the first detector.

12. The touch panel apparatus according to claim 10, wherein
the touch operation over the predetermined area corresponds to a touch operation with three or more fingers of a user.

13. The touch panel apparatus according to claim 12, wherein
the operation command corresponding to the first operation is a first operation command,
the operation command corresponding to the second operation is a second operation command, and
the microprocessor is configured to perform
the outputting including outputting a third operation command when the touch operation over an area less than the predetermined area on the outer peripheral surface is detected by the plurality of touch sensors in a situation where the first operation is not detected by the first detector, while outputting a fourth command different from the third command when the touch operation over the predetermined area on the outer peripheral surface is detected by the plurality of touch sensors.

\* \* \* \* \*